United States Patent [19]

Taricco

[11] Patent Number: 5,441,692
[45] Date of Patent: Aug. 15, 1995

[54] PROCESS AND APPARATUS FOR AUTOCLAVE RESIN TRANSFER MOLDING

[75] Inventor: Todd Taricco, Zephyr Cove, Nev.

[73] Assignee: Thermal Equipment Corporation, Torrance, Calif.

[21] Appl. No.: 196,409

[22] Filed: Feb. 14, 1994

[51] Int. Cl.6 .............................................. B29C 70/48
[52] U.S. Cl. .................................. 264/571; 264/257; 425/129.1; 425/389
[58] Field of Search ............... 264/257, 258, 316, 510, 264/511, 571, 102; 425/388, 389, 405.1, 110, 129.1, 543

[56] References Cited

U.S. PATENT DOCUMENTS

| 4,030,953 | 6/1977 | Rutschow et al. | 264/257 |
| 4,132,755 | 1/1979 | Johnson | 264/258 |
| 4,952,366 | 8/1990 | Gelin | 264/511 |
| 5,114,637 | 5/1992 | Williams et al. | 264/571 |
| 5,152,949 | 10/1992 | Leoni et al. | 264/257 |
| 5,183,619 | 2/1993 | Tolton | 264/257 |
| 5,281,388 | 1/1994 | Palmer et al. | 264/571 |

FOREIGN PATENT DOCUMENTS

| 1909896 | 9/1970 | Germany | 264/571 |
| 54-38384 | 3/1979 | Japan | 264/257 |
| 56-77124 | 6/1981 | Japan | 264/225 |
| 62-156912 | 7/1987 | Japan | 264/257 |
| 887911 | 1/1962 | United Kingdom | 264/257 |
| 255543 | 12/1977 | U.S.S.R. | 264/571 |

Primary Examiner—Jay H. Woo
Assistant Examiner—Robert B. Davis
Attorney, Agent, or Firm—Blakely, Sokoloff, Taylor & Zafman

[57] ABSTRACT

A resin transfer molding process and system for creating composite materials. The system includes encapsulating a fibrous sheet within a tool and a cover plate that together define an inner cavity. The tool, the cover plate and the sheet are placed within the inner chamber of an autoclave. The pressure in the inner cavity is then reduced to create a vacuum within the tooling. The pressure of the inner chamber of the autoclave is also reduced so that the differential pressure across the tool is essentially zero. A resin is then introduced to the inner cavity. The inner cavity pressure may be increased by the introduction of the resin. The pressure of the autoclave inner chamber may be raised, so that there is a minimal pressure differential across the tool. After the tool is filled with resin, the inner cavity is heated by the autoclave to cure and form a composite material.

14 Claims, 1 Drawing Sheet

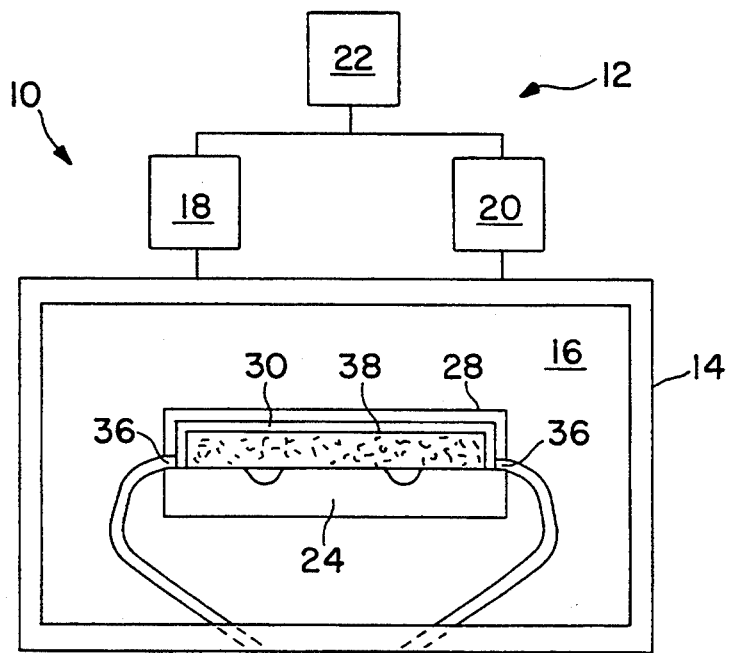
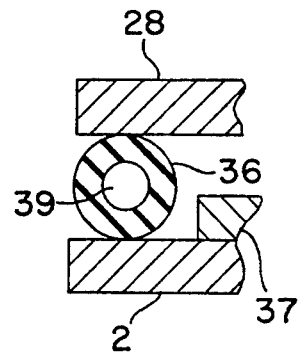
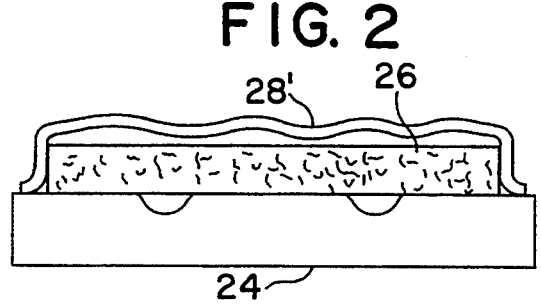
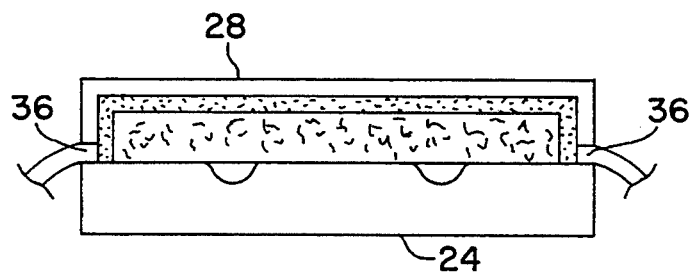
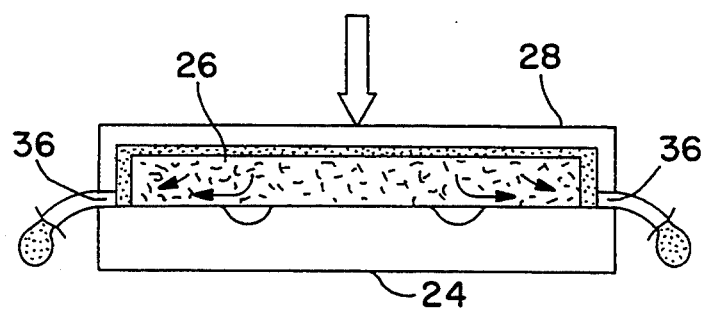

PROCESS AND APPARATUS FOR AUTOCLAVE RESIN TRANSFER MOLDING

BACKGROUND OF THE INVENTION

1. Field of the Invention

The present invention relates to a method and system for forming a composite material by resin transfer molding.

2. Description of the Related Art

Composite materials are typically formed by impregnating a fibrous sheet with a thermosetting organic resin. To create the composite material, the fibrous sheet is typically placed on a tool which has a pattern corresponding to the desired shape of the composite. The sheet is then encapsulated by a cover plate that is fastened to the tool.

A vacuum is pulled within the inner cavity of the tooling to remove gaseous and liquid impurities from the cavity. A resin is then pumped into the inner cavity. The inner cavity is subsequently heated to cure and form the composite material.

The resin is typically pumped into the inner tool cavity at pressures ranging from 30–250 psi. The tooling must be strong enough to withstand such high pressures. Consequently, tooling for forming composite materials is typically constructed from thick metal plates. Thick metal plates are heavy and difficult to carry and maneuver. Additionally, the large mass of the tooling has a relatively high thermal capacitance, thereby requiring extended time periods to heat and cool both the tooling and the part. It would be desirable to provide a resin transfer molding process and system that did not require large tooling plates.

Because of the woven nature of the fibrous preformed structure, it is sometimes difficult to fit the sheet between the tool and the cover plate. The fibrous sheet may create a gap between the tool and the cover, which decreases the pressure within the inner tool cavity and causes a variation of resin content in the final composite. The mismatch between the sheet and the tooling may also damage the fibers within the preform. Present resin transfer molding techniques also tend to produce a composite material which has a non-uniform distribution of resin throughout the composite. It would be desirable to provide a resin transfer molding process and system that would provide a more even distribution of resin throughout the composite and which would allow the fibrous sheet to easily fit within the tooling.

SUMMARY OF THE INVENTION

The present invention is a resin transfer molding process and system for creating composite materials. The system includes encapsulating a fibrous sheet within a tool and a cover plate that together define an inner cavity. The tool, the cover plate and the sheet are placed within the inner chamber of an autoclave. The pressure in the inner cavity is then reduced to create a vacuum within the tooling. The pressure of the inner chamber of the autoclave is also reduced so that the differential pressure across the tool is essentially zero. A resin is then introduced to the inner cavity. The inner cavity pressure may be increased by the introduction of the resin. The pressure of the autoclave inner chamber may be raised, so that there is a minimal pressure differential across the tool. After the tool is filled with resin, the inner cavity is heated by the autoclave to cure and form a composite material. Reducing and increasing the inner chamber pressure of the autoclave to offset the inner pressure of the tool reduces the stresses on the tooling material and allows the tool and cover plate to be constructed from a relatively thin material. The thin material reduces the weight and thermal capacitance of the tooling, thereby increasing the ease of operation and reducing the production cycle time of the resin transfer molding process.

Located between the cover and the tool is a flexible joint that creates a gap between the fibrous sheet and the cover plate. The flexible joint allows resin to flow into the inner cavity to fill the gap above the sheet. After the inner cavity is filled with resin, the pressure of the inner autoclave chamber is raised above the pressure of the inner cavity. The differential pressure moves the cover plate, and pushes the resin within the gap through the sheet and out of the tool cavity. The flexible joint closes when the cover has moved a predetermined distance. The diffusion of resin from the gap creates a more uniform distribution of resin in the composite material. The gap also allows the fibrous sheet to be more readily captured by the tool.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a schematic of a resin transfer molding system of the present invention;

FIG. 2 is an alternate embodiment of the resin transfer molding system, wherein the cover of the tooling is constructed from a flexible bag;

FIG. 3 is an end view of a flexible joint between the cover plate and the tool;

FIG. 4 is a cross-sectional view showing the inner cavity of the tooling filled with resin;

FIG. 5 is a cross-sectional view similar to FIG. 4, wherein a portion of the resin flows through the fibrous sheet.

DETAILED DESCRIPTION OF THE INVENTION

Referring to the drawings more particularly by reference numbers, FIG. 1 shows a resin transfer molding system 10 of the present invention. The system 10 is typically used to create a composite material that is constructed from a fibrous sheet that is impregnated with a resin. Although a composite material is shown and described, it is to be understood that the present invention can be used to create other parts which are formed by pressure and a tool.

The system 10 includes an autoclave 12. The autoclave 12 has a tank 14 which defines an inner chamber 16. The inner chamber 16 can be heated by a heating subsystem 18 that is coupled to the tank 14. Likewise, the inner chamber 16 can be pressurized by a pressure subsystem 20 that is also coupled to the tank 14. The temperature and pressure of the inner chamber 16 can be controlled by a computer based control system 22 which can set, monitor, adjust and vary the tank pressure and temperature. The tank 14 typically has a door (not shown) which allows an operator to place items within the inner chamber 16.

Located within the inner chamber 16 of the tank 14 is a tool 24. Adjacent to the tool 24 is a fibrous sheet 26 which is used to create a composite material. The tool 24 has a pattern that corresponds to the desired cured shape of the composite. The tool 24 can be constructed from composite materials, thin film metals, ceramics or conventional metallics. The sheet 26 is enclosed by a cover plate 28. The cover plate 28 may be constructed from the same rigged material as the tool 24. As shown in FIG. 2, the cover 28 may also be constructed from a flexible bag material 28', such as nylon, which is taped to the tool 24.

The cover plate 28 and tool 24 define an inner cavity 30. The inner cavity 30 is in fluid communication with a pump/compressor subsystem 32 and a source of resin 34. The resin is typically an organic thermosetting material which binds and forms a composite with the fibrous material when subjected to elevated temperatures and pressures. The pump/compressor subsystem 32 may be capable of both pressurizing the inner cavity 30 and creating a vacuum therein.

Between the cover plate 28 and the tool 24 are flexible joints 36. The flexible joints 36 provides fluid communication between the inner cavity 30 and the pump/compressor subsystem 32. The flexible joints 36 also separate the cover plate 28 from the tool 24 and create a gap 38 between the cover 28 and the fibrous sheet 26. The gap 38 allows the fibrous sheet 26 to be placed within the tooling without creating undesirable spaces between the cover 28 and the tool 24. The gap 38 is typically filled with resin when the composite is being formed.

As shown in FIG. 3, the flexible joints 36 are preferably O-rings. When the pressure within the inner chamber 16 is greater than the pressure within the inner cavity 30, the cover plate 28 is pushed toward the tool 24 until the flexible joints 36 collapse and the openings 39 within the O-rings 36 are closed. The movement of the cover plate 28 pushes the resin out of the cavity 30 until the flexible joints 36 are closed. The system may include a stop 37 that limits the amount of joint deflection.

To form a composite sheet, the fibrous sheet 26 is first placed onto the tool 24. The cover plate 28 is then coupled to the tool 24 to encapsulate the sheet 26. The cover 28, the tool 24 and the sheet 26 are placed within the inner chamber 16 of the tank 14 and coupled to the pump/compressor subsystem 32. The inner chamber 16 of the tank 14 may be heated by the temperature subsystem 18 to remove any residual water that may exist in the sheet or tooling.

A vacuum is pulled within the inner cavity 30 of the tooling by the pump/compressor subsystem 32. The pump subsystem 20 of the autoclave also reduces the pressure of the inner chamber 16, so that there is a net pressure across the tool 24 and the cover 28 that is essentially zero. The zero net pressure across the tool 24 and the cover 28 significantly reduces the forces and corresponding stresses on the tooling material. The lower forces allow the tool 24 and cover 28 to be constructed with relatively thin walls, which reduces the weight and the thermal capacitance of the tooling. In the embodiment utilizing the flexible bag 28' shown in FIG. 3, the pressure within the inner chamber 16 is slightly lower than the pressure within the inner cavity 30, so that there is created a gap 38 between the bag 28 and the fibrous sheet 26.

The resin is introduced to the inner cavity 30 from the resin source. The resin can be induced to flow into the inner cavity 30 by the vacuum created within the tooling, by positively pumping the resin into the inner cavity, or both. As shown in FIG. 4, the resin fills the gap 38 between the cover 28 and the fibrous sheet 26.

The flow of resin into the inner tool cavity 30 increases the pressure of the cavity 30. To offset the increase in cavity pressure, the pressure within the inner chamber 16 is raised by the pressure subsystem 20 of the autoclave 12. The pressure of the inner chamber 16 is then typically increased to a level higher than the pressure within the inner cavity 30, so that the cover 28 moves toward the tool 24 and reduces the volume of the cavity 30. The reduction in the volume of the inner cavity 30 causes resin to flow out of the cavity 30 and through the flexible joint 36.

As shown in FIG. 5, the resin flows through the sheet 26 from the gap 38. The diffusion of resin from the gap 38 to the flexible joints 36, more evenly distributes the resin throughout the sheet 26 and provides a composite part that has a relatively uniform concentration of resin.

The resin flows out of the inner cavity 30 until the flexible joints 36 collapse and cut off fluid communication to the pump/compressor subsystem 32. The temperature subsystem 18 of the autoclave 12 heats the inner chamber 16 and the fibrous sheet/resin material located within the tooling. The desired temperature(s) and pressure(s) are maintained until the composite has cured and formed onto the tool 24. The pressure and temperature of the inner chamber 16 and the inner cavity 30 are then brought to atmospheric, and tooling is removed from the tank 14.

The present invention thus provides a resin transfer molding process and system that can utilize relatively thin tooling and create a composite material that contains a uniform concentration of resin throughout the composite.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A resin transfer molding system, comprising:
   an autoclave with an inner chamber;
   a tool within said inner chamber of said autoclave;
   a cover coupled to said tool to create an inner cavity;
   tool pressure means for creating a first pressure within said inner cavity;
   autoclave pressure means for creating a second pressure within said inner chamber so that a net pressure across said cover is zero;
   resin pumping means for pumping a resin into said inner cavity; and,
   a flexible joint between said cover and said tool, said flexible joint allowing fluid communication between said inner cavity and said resin pumping means, and preventing said fluid communication between said inner cavity and said resin pumping means when said second pressure exceeds said first pressure by a predetermined value.

2. The system as recited in claim 1, wherein said cover is constructed from a flexible bag.

3. The system as recited in claim 1, wherein said flexible joint is an O-ring.

4. The system as recited in claim 1, wherein said flexible joint creates a gap between said cover and a sheet located within said inner cavity.

5. A resin transfer molding system, comprising:
a tool;
a cover coupled to said tool to create an inner cavity;
resin pumping means for pumping a resin into said inner cavity; and,
a flexible joint located between said cover and said tool, said flexible joint providing fluid communication between said resin pumping means and said inner cavity, said flexible joint preventing fluid communication between said resin pumping means and said inner cavity when a differential pressure across said cover attains a predetermined level.

6. The system as recited in claim 5, wherein said flexible joint is an O-ring.

7. The system as recited in claim 5, wherein said flexible joint creates a gap between said cover and a sheet located within said inner cavity.

8. A method for forming a composite part from a material and a resin, comprising the steps of:
a) placing the material on a tool;
b) attaching a cover to said tool to encapsulate the material, said tool and said cover defining an inner cavity that has a tool pressure;
c) placing said cover, said tool and the material within an inner chamber of an autoclave, said inner chamber having an autoclave pressure;
d) varying the tool pressure of said inner cavity and the autoclave pressure of said inner chamber so that a net pressure across said cover is approximately zero; and,
e) introducing a resin to said inner cavity.

9. The method as recited in claim 8, wherein said pressure within said inner cavity and said inner chamber is reduced in step (d).

10. The method as recited in claim 9, further comprising the step (f) of increasing the autoclave pressure of said inner chamber so that resin is pushed out of said inner cavity.

11. The method as recited in claim 10, wherein said steps (d)–(f) are repeated a predetermined number of times.

12. The method as recited in claim 10, wherein said resin is introduced into said inner cavity to fill a gap between the material and said cover.

13. The method as recited in claim 12, wherein resin is pushed through the material from said gap when resin is pushed out of said inner cavity.

14. The method as recited in claim 8, further comprising the step of heating the material.

* * * * *